R. NIELSEN & J. IMIRIE.
EGG BEATER.
APPLICATION FILED JUNE 16, 1909.
955,672.
Patented Apr. 19, 1910.
3 SHEETS—SHEET 2.
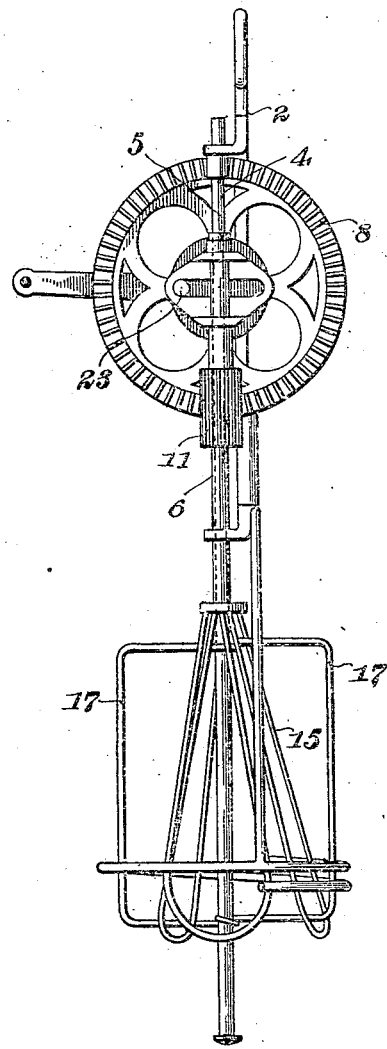
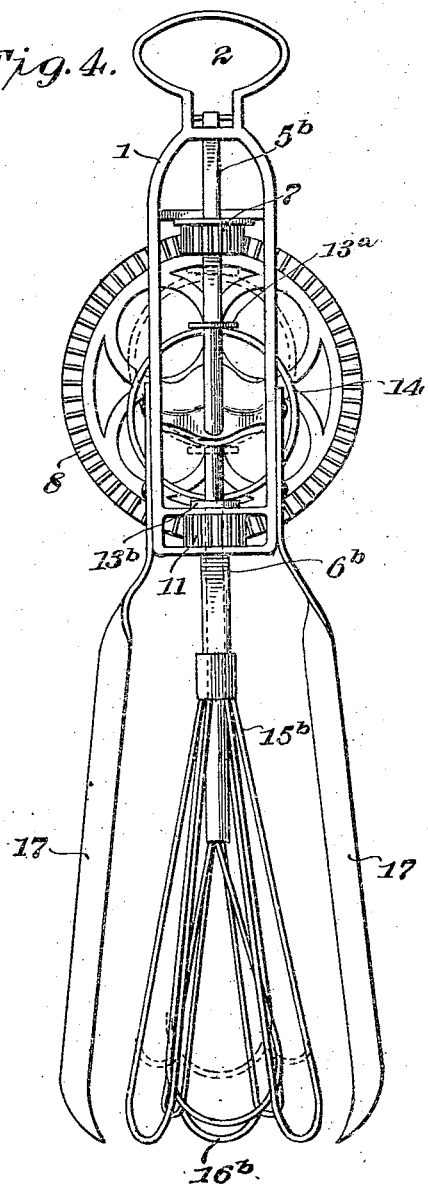
Witnesses
J. A. Bishop
Helzell A Murray
Inventors
Rasmus Nielsen
John Imirie
By
Attorney

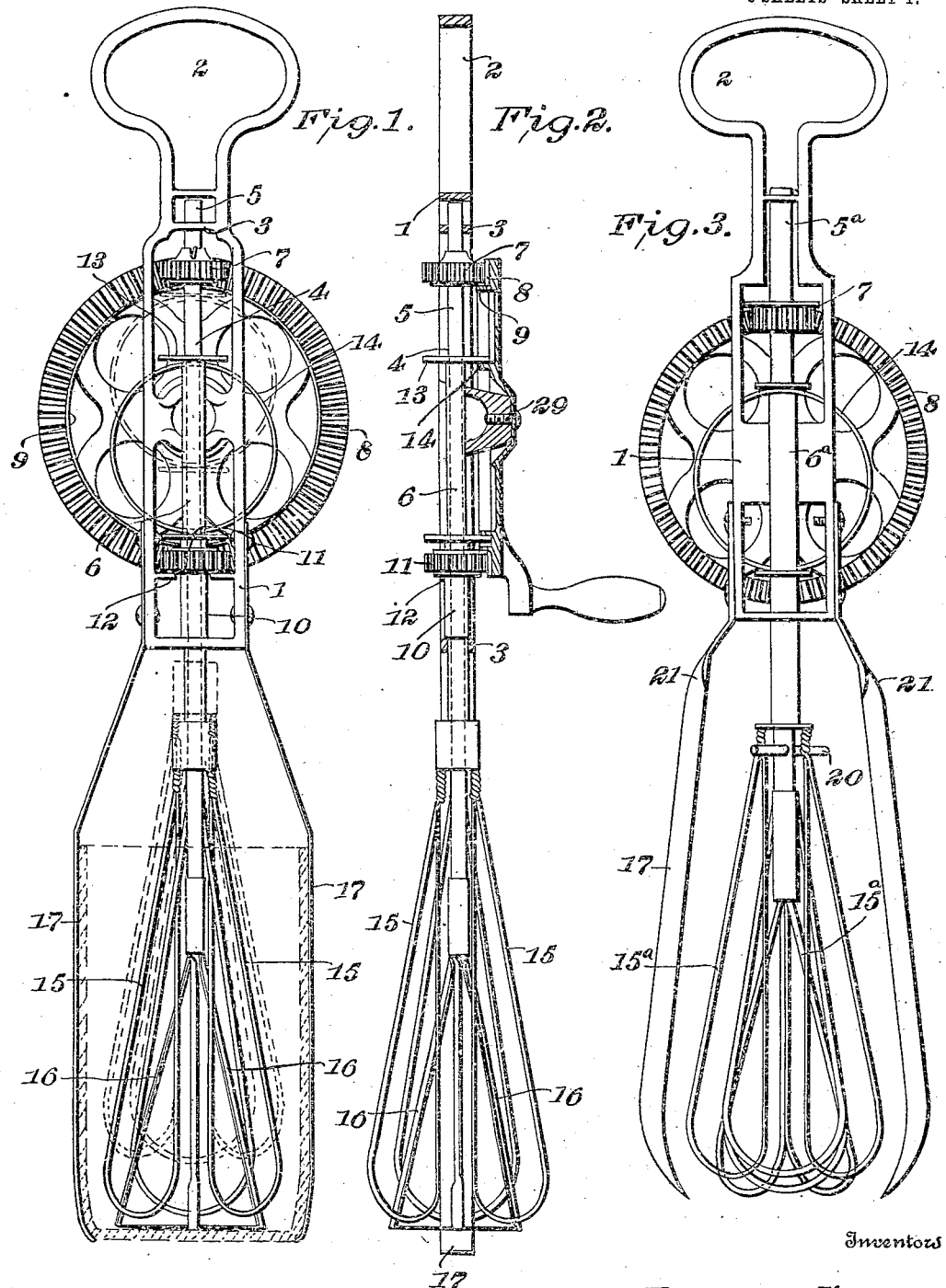

R. NIELSEN & J. IMIRIE.
EGG BEATER.
APPLICATION FILED JUNE 16, 1909.

955,672.

Patented Apr. 19, 1910.
3 SHEETS—SHEET 3.

Witnesses
J. A. Bishop

Inventors
Rasmus Nielsen,
John Imirie
By
Attorney

UNITED STATES PATENT OFFICE.

RASMUS NIELSEN, OF TROY, NEW YORK, AND JOHN IMIRIE, OF WASHINGTON, DISTRICT OF COLUMBIA.

EGG-BEATER.

955,672.  Specification of Letters Patent.  Patented Apr. 19, 1910.

Application filed June 16, 1909. Serial No. 502,623.

*To all whom it may concern:*

Be it known that we, RASMUS NIELSEN, a citizen of the United States, residing at Troy, in the county of Rensselaer and State of New York, and JOHN IMIRIE, a citizen of the United States, residing at Washington, District of Columbia, have invented certain new and useful Improvements in Egg-Beaters, of which the following is a specification.

This invention relates to improvements in egg beaters, although it is not limited to this particular use.

The prime object of the invention is to provide means for creating a simultaneous centrifugal and vertical reciprocating motion, to cause the material acted on to be thoroughly mixed and agitated.

A further object of the invention is to provide convenient means for slipping the beater over a receptacle or the like, that the beater blades may be fitted into a small space when it is desired to beat but one or two eggs, or whip a small portion of cream.

Because of the rapid revolution and vertical reciprocation of the beater blades, they have a tendency to throw the eggs above the receptacle causing splashing. The invention comprehends improvements in the means employed to overcome this objection.

The invention also relates to the specific details of construction and arrangement of parts hereinafter described and particularly pointed out in the claims.

Figure 6:
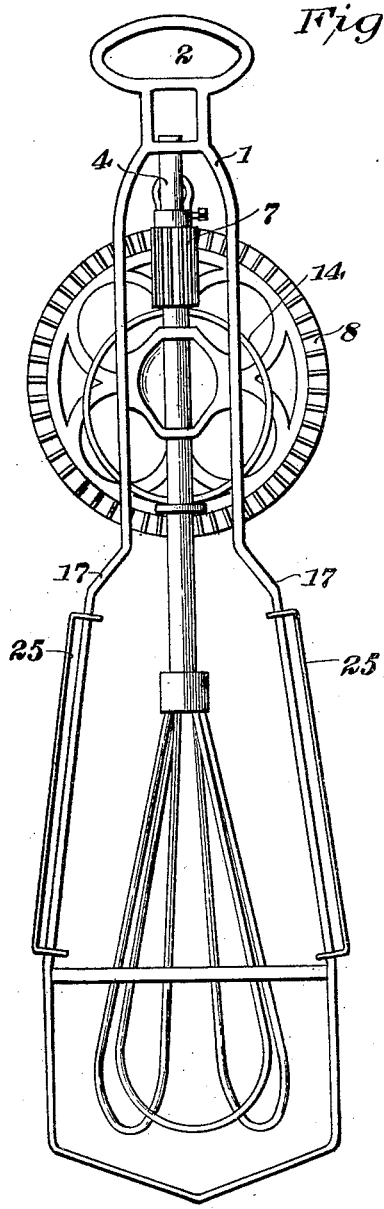
Figure 7:
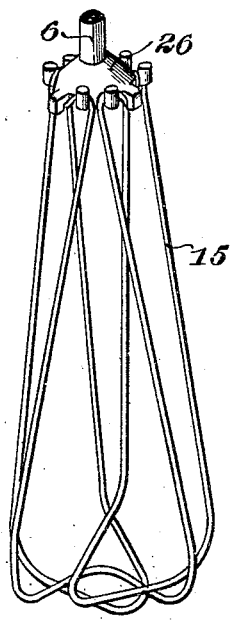
Figure 8:
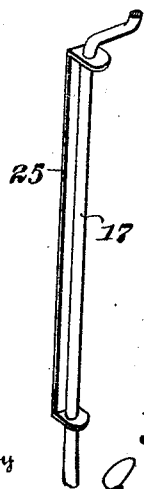

In the drawings: Figure 1, is an elevation of the preferred form of the invention. Fig. 2, is a vertical section of the same. Fig. 3, is an elevation of a beater illustrating mechanism for revolving the two beater blades in the same direction. Fig. 4, is a view illustrating a form of the invention where the two beater blades revolve in opposite direction, and reciprocate simultaneously. Fig. 5, is a view in elevation of a slightly different form of the invention. Fig. 6, is a view in elevation showing a single beater blade. Fig. 7, is a detail view of one form of connecting the wires forming the beaters to the operating shaft. Fig. 8, is a detail view.

Referring to Figs. 1, and 2; 1, designates a frame having a handle 2, and provided with bearings 3, for the reception of a telescopic shaft 4. For the convenience in assembling the parts the bearings 3, are open, as will be described later on. The shaft 4, is formed in two parts and comprises an upper member 5, and a lower member 6, the latter being a sleeve adapted to slide on the upper member. The member 5, has secured to it a pinion 7, meshing with a gear wheel 8, mounted on a bearing extending from the frame 1, preferably in the form of a screw. The gear wheel 8, is formed with an inwardly projecting flange 9, which fits under the pinion 7, to assist in holding the lower shaft member in proper relation in the frame 1. The sleeve or member 6, is provided with an angular portion 10, on which is mounted to slide a pinion 11, confined between the flanges 9, and inwardly projecting flanges 12, on the frame 1. Just above the angular portion of the sleeve and at the extreme upper end of the latter is a flange 13, against the under side of which bears a cam 14, formed on the gear wheel 8. The lower end of the sleeve or member 6, is provided with a series of beater blades 15, which encircle a series of beater blades 16, secured on the lower end of the shaft 5. The beater blades 16, travel in a circular path, motion being imparted to the shaft 5, by the gears 7, and 8. The sleeve or member 6, and the beater blades 15, revolve around, and in opposite direction to the beater blades 16, and in addition to this revoluble movement, said beater blades 15 have a reciprocating movement imparted by the cam 14. The simultaneous revoluble movement being imparted through the gears 7—8, and 11. Secured to or forming a part of the frame 1, are outwardly and downwardly extending arms 17, preferably of spring metal. These arms are outside the path of movement of the beater blades 15, and at their lower ends they form a support when the beater is in use. The arms not only support the beater but when it is desired to beat, say one or two eggs, or whip a small portion of cream, and in order that the beater may be effective, the arms being open at the bottom, they straddle the receptacle containing the egg or cream, permitting of the beater blades fitting within said receptacle as shown in Fig. 1.

In the form of the invention shown in Fig. 3, the pinion 11, is dispensed with, and a pin or similar connection indicated at 20, is employed to cause the two members 5ª, and 6ª, of the shaft to revolve in the same direction. It will be observed however that the beaters 15ª—15ª, have the same reciprocal as well as rotary movement previously described, but the both sets of blades revolve in the same direction. In this figure the arms 17, are twisted as at 21, so as to present the flat sides to the agitated mass being acted on by the blades to prevent splashing.

In Fig. 4, we have shown a different form of the invention wherein the member 5ᵇ, of the shaft is provided with a flange 13ª, and the sleeve or member 6ᵇ, is provided with a flange 13ᵇ. In this construction the beater blades 15ᵇ, and 16ᵇ, are caused to revolve and reciprocate simultaneously, however the revolution of the said blades is reversed.

In Fig. 5, we have shown a slightly different form of the invention in that the frame is modified, and the beater blades revolve and reciprocate at the same time, and in place of the cam 14, a crank and slot connection 23, is employed.

In Fig. 6, we employ a reciprocating shaft and cam similar to one of the forms previously described and in addition thereto provide the support 17, with wings or gates 25, to brake the centrifugal force of the egg as it is beaten to prevent splashing, and to further assist in mixing the elements.

In Fig. 7, we have shown a different form of connection between the beater blades and the operating shaft, the same consisting of a spider 26, on the end of the shaft, and the wire forming the blades is twisted around the ends of said spider to form a substantial connection.

According to this invention it will be obvious when the beater is in operation both sets of beater blades cause a quick centrifugal movement of the eggs in two directions, thoroughly agitating and mixing the elements, the centrifugal movement being interrupted by the lifting action imparted by the cam operating on the blades 15 and 16. This interruption of the centrifugal movement of the eggs tends to draw the liquid mass inwardly and upwardly, thus bringing all the particles into contact with the blades.

A screw or other fastening device 29, is used to secure the gear wheel to the frame. The gear holds the shaft in the bearings 3, and when it is desired to remove the parts for any purpose, it is only necessary to release the fastening device 29, and when the gear is removed, the shaft may be readily withdrawn from the frame, through the open end bearings.

What we claim is:

1. In an egg beater, the combination of a frame, spring arms extending down from the frame to fit in and hold the egg beater in a receptacle, a revolving shaft, beater blades carried thereby adjacent the spring arms, and gears for revolving the beater blades.

2. In an egg beater, the combination of a frame, spring arms extending down from the frame to fit in and hold the egg beater in a receptacle, a revolving shaft, beater blades carried thereby adjacent the spring arms, gears for revolving the beater blades, and means operated by one of the gears for reciprocating said blades while the latter are being revolved.

3. In an egg beater the combination with a frame, arms extending downwardly therefrom, beater flights pivotally mounted on the arms, beater blades, means for revolving the beater blades and means for reciprocating the beater blades while being revolved.

4. In an egg beater, the combination with a frame, a shaft formed of two members, one member fitting within the other, beater blades connected to each of the members, means for revolving the beater blades, and means coöperating with the revolving means for simultaneously reciprocating the beater blades.

5. In an egg beater the combination with a frame, a shaft formed of two members, beater blades connected to each member of the shaft, means for revolving the beater blades, and means coöperating with the revolving means for simultaneously reciprocating certain of said blades vertically.

6. In an egg beater, the combination with a frame, a shaft formed of two members, beater blades connected to each member of the shaft, means for simultaneously revolving the beater blades in opposite directions, and means coöperating with the revolving means for reciprocating one set of beater blades vertically while they are revolving.

7. In an egg beater the combination with a frame having bearings, a telescopic shaft mounted in the bearings, gears for revolving the sections of the telescopic shaft, beater blades carried by the shaft, and means coöperating with the gears for reciprocating the revolving beater blades vertically.

8. In an egg beater, the combination with a frame having bearings, a shaft mounted in the bearings, a pinion mounted on the shaft, a gear mounted on the frame and meshing with the pinion, means coöperating with the gear and shaft for simultaneously reciprocating the shaft vertically during its revolution and beater blades carried by the shaft.

9. In an egg beater, the combination with a frame having bearings, a shaft mounted in the bearings, a pinion mounted on the shaft, a gear mounted on the frame and meshing with the pinion, means coöperating with the gear and shaft for reciprocating the shaft during its revolution, beater blades carried by the shaft, and spring arms extending from the frame outside the path of movement of the beater blades to fit in a receptacle to hold the egg beater in place.

10. In an egg beater the combination with a frame having open bearings, a shaft mounted in the bearings, beater blades carried by the shaft, a pinion on the shaft, a gear meshing with the pinion, and a fastener for securing the gear to the frame, said gear holding the shaft in the open bearings.

11. In an egg beater, the combination with a frame, bearings in the frame, a shaft mounted in the bearings, a pinion on the shaft, beater blades carried by the shaft, a gear mounted on the frame, a flange extending from the gear to engage and hold the gear in relative position on the shaft, and a cam on the gear for reciprocating the shaft.

In testimony whereof we affix our signatures in presence of two witnesses.

RASMUS NIELSEN.
JOHN IMIRIE.

Witnesses:
L. H. GILES,
NELS NIELSEN.